(12) United States Patent
Wallace

(10) Patent No.: US 6,634,561 B1
(45) Date of Patent: Oct. 21, 2003

(54) MEMORY CARD ELECTRICAL CONTACT STRUCTURE

(75) Inventor: Robert F. Wallace, Sunnyvale, CA (US)

(73) Assignee: SanDisk Corporation, Sunnyvale, CA (US)

( * ) Notice: Subject to any disclaimer, the term of this patent is extended or adjusted under 35 U.S.C. 154(b) by 117 days.

(21) Appl. No.: 09/590,029

(22) Filed: Jun. 7, 2000

Related U.S. Application Data

(60) Provisional application No. 60/140,963, filed on Jun. 24, 1999.

(51) Int. Cl.$^7$ ................................................ G06K 19/06
(52) U.S. Cl. ........................ 235/492; 235/441; 439/951; 439/159
(58) Field of Search ............................ 235/492; 439/951, 439/159, 152–160

(56) References Cited

U.S. PATENT DOCUMENTS

| | | | |
|---|---|---|---|
| 3,702,464 A | 11/1972 | Castrucci | 340/173 |
| 4,264,917 A | 4/1981 | Ugon | 357/74 |
| 4,532,419 A | 7/1985 | Takeda | 235/492 |
| 4,555,619 A | * 11/1985 | Anderson | 235/482 |
| 4,565,922 A | 1/1986 | Anderson | 235/492 |
| 4,752,678 A | 6/1988 | Rikuna | 235/380 |
| 4,764,666 A | 8/1988 | Bergeron | 235/380 |
| 4,766,293 A | 8/1988 | Boston | 235/379 |
| 4,766,480 A | 8/1988 | Hamada | 357/74 |
| 4,849,944 A | 7/1989 | Matsushita | 371/21 |
| 4,864,116 A | * 9/1989 | Banjo et al. | 235/492 |
| 4,887,234 A | 12/1989 | Iijima | 364/900 |
| D305,886 S | 2/1990 | Banjo et al. | D14/117 |
| 5,003,520 A | 3/1991 | Grieu et al. | 368/90 |
| 5,031,026 A | 7/1991 | Ueda | 357/74 |
| 5,049,728 A | 9/1991 | Rovin | 235/492 |
| 5,272,374 A | 12/1993 | Kodai et al. | 257/679 |
| D353,135 S | 12/1994 | Gloton | D14/117 |
| 5,375,037 A | 12/1994 | Le Roux | 361/684 |
| D357,909 S | 5/1995 | Gloton | D14/114 |
| 5,612,532 A | 3/1997 | Iwasaki | 235/492 |

(List continued on next page.)

FOREIGN PATENT DOCUMENTS

| | | |
|---|---|---|
| AU | B8130691 | 7/1991 |
| DE | 3743335 | 12/1987 |
| EP | 495216 A2 | 12/1991 |
| EP | 535436 A2 | 9/1992 |
| JP | 58208882 | 12/1983 |
| JP | 5941092 | 3/1984 |
| JP | 454582 | 2/1992 |

OTHER PUBLICATIONS

SD Group, "SD Memory Card Simplified Specifications, Part 1, Physical Layer Specification", Version 0.96, Jan. 2000, 28 pages.

SD Group, "SD Memory Card Specifications, Simplified Version of Part 1, Physical Layer Specification", Version 1.01, Apr. 15, 2001, 32 pages.

SanDisk Corporation MultiMedia Card Product Manual, 2000, pp. 1–86.

MMCA Technical Committee System Specification, "The MultiMedia Card", Version 1.4 Official Release, Feb. 1998, pp.1–106.

*Primary Examiner*—Michael G. Lee
*Assistant Examiner*—Seung Ho Lee
(74) *Attorney, Agent, or Firm*—Parsons Hsue & de Runtz LLP

(57) ABSTRACT

A small, flat rectangularly shaped electronic circuit card, such as one containing non-volatile memory, has a row of contacts mounted on bottom surfaces of a row of recesses extending along a short edge and an adjacent angled corner. At least one of the recesses opens to the angled corner and the remaining recesses open to the short edge. Two surface contacts are included in at least one of the recesses, while the remaining recesses each contain a single contact.

14 Claims, 1 Drawing Sheet

U.S. PATENT DOCUMENTS

| | | | |
|---|---|---|---|
| 5,655,917 A | 8/1997 | Kaneshige et al. | 439/155 |
| 5,677,524 A | 10/1997 | Haghiri-Tehrani | 235/492 |
| 5,714,742 A | 2/1998 | Ieda | 235/441 |
| 5,757,116 A | 5/1998 | Nishikawa et al. | 235/492 |
| 5,780,837 A | 7/1998 | Garcia | 235/492 |
| 5,822,190 A * | 10/1998 | Iwasaki | 361/737 |
| 5,992,754 A | 11/1999 | Ito et al. | 235/486 |
| 6,040,622 A | 3/2000 | Wallace | 257/679 |
| 6,056,573 A * | 5/2000 | Nishioka | 439/326 |
| 6,059,191 A | 5/2000 | Sedlak et al. | 235/492 |
| 6,072,698 A | 6/2000 | Houdeau et al. | 361/737 |
| 6,109,939 A * | 8/2000 | Kondo et al. | 439/140 |
| D434,396 S | 11/2000 | Iwasaki | D14/117 |
| D443,622 S | 6/2001 | Iwasaki et al. | D14/479 |
| D444,473 S | 7/2001 | Okamoto et al. | D14/436 |
| D445,096 S * | 7/2001 | Wallace | D14/114 |
| 2001/0009505 A1 | 7/2001 | Nishizawa et al. | |

* cited by examiner

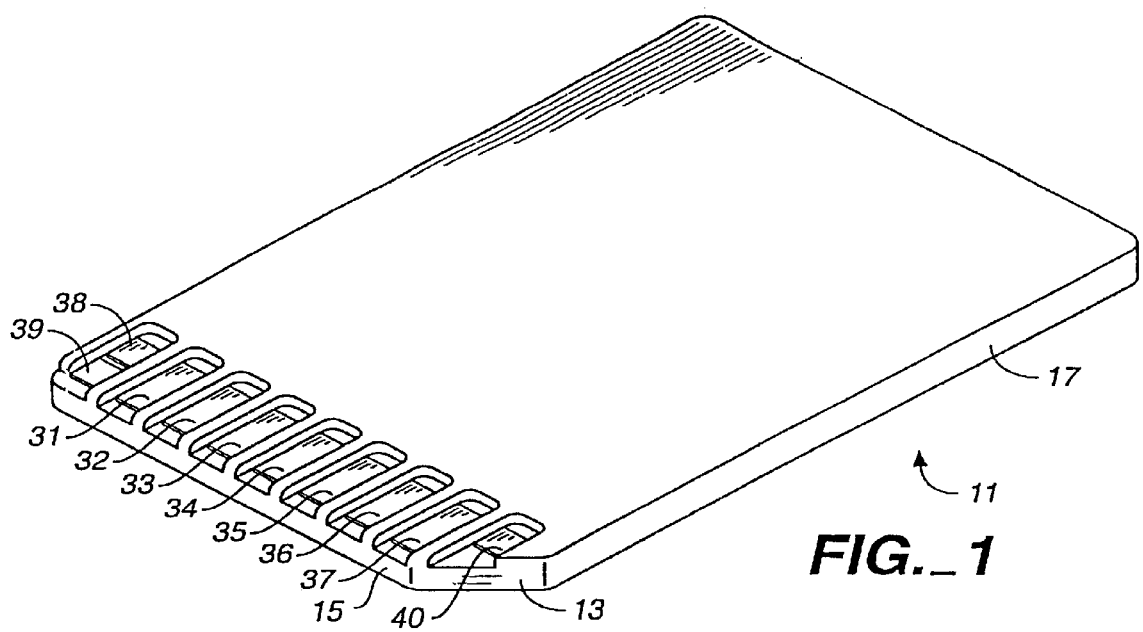
FIG._1
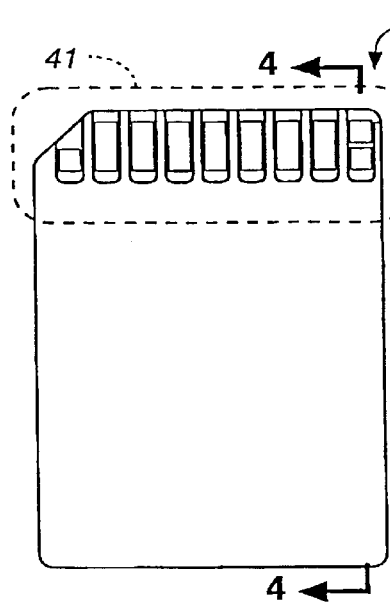
FIG._2
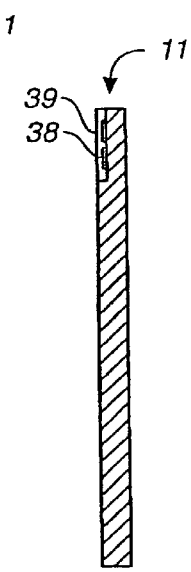
FIG._4
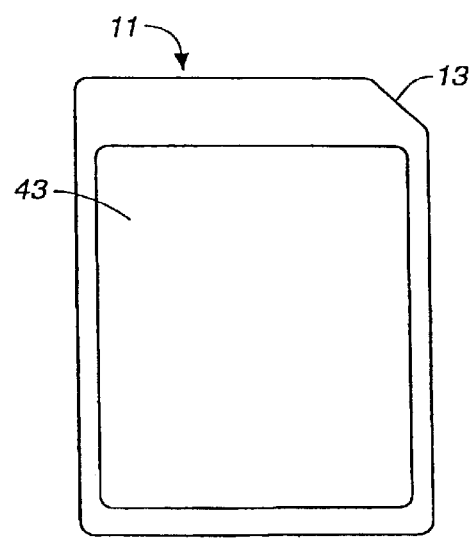
FIG._5
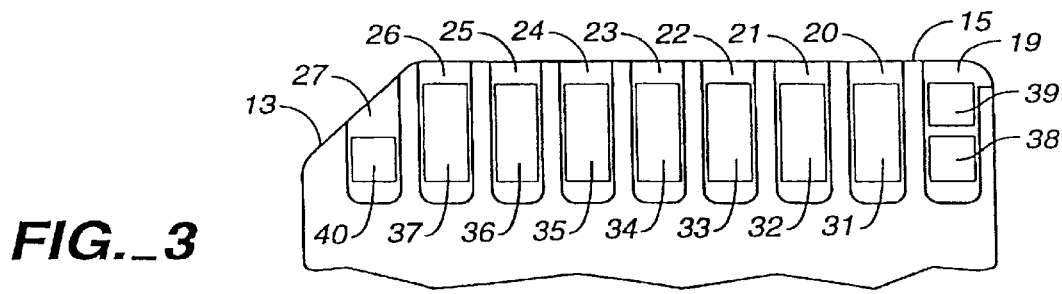
FIG._3

MEMORY CARD ELECTRICAL CONTACT STRUCTURE

CROSS-REFERENCE TO A RELATED APPLICATION

This application claims the benefit of provisional application Ser. No. 60/140,963, filed Jun. 24, 1999, which provisional application is incorporated herein by this reference.

BACKGROUND OF THE INVENTION

This invention relates to a small card containing digital memory, such as a non-volatile flash EEPROM system, having exposed surface electrical contacts that allow easy connection to and removal from a receptacle of a host electronic system or device, particularly portable devices, in order to provide removable electrical connection between the system or device and the memory within the card through the exposed surface contacts of the card.

Small memory cards are increasing in popularity for use in small hand held devices such as cellular telephones, music players and other personal electronic equipment. Memory cards are being made smaller for such applications while the size of their individual external surface electrical contacts are not being reduced in size to any significant degree. This presents a challenge to the design and packaging of such memory cards. In a specific example, an existing commercial Multi-Media Card (MMC) product has been manufactured and sold for a time. The MMC has seven surface contacts extending across a short edge of the rectangular card that also includes a cut-off corner. Evolving applications for this type of memory card have made it necessary to add several external contacts without increasing the size of the card.

SUMMARY OF THE INVENTION

This has been accomplished by increasing the number of contacts of the row of contacts used on the MMC product while maintaining the position of the row along the short edge of the rectangularly shaped card. This maintains a degree of compatibility between the MMC product and the new card, known as a SD Card product. In order to increase the number of contacts, two contacts are positioned in the space previously occupied by one and another contact is positioned at the cut off corner and set back from the card edge a distance that is greater than other contacts of the row.

Additional features, objects and advantages of the present invention are included in the following detailed description, which description should be read in conjunction with the accompanying drawings.

BRIEF DESCRIPTION OF THE DRAWINGS

FIG. 1 is an isometric view of the improved removable memory card, showing its top front side and left side;

FIG. 2 is a top plan view of the memory card of FIG. 1;

FIG. 3 is an expanded view of a portion 41 of the top plan view of FIG. 2, most accurately showing the structure of its recesses and contacts;

FIG. 4 is a sectional view of the memory card of FIG. 1, taken at section 4—4 of FIG. 2; and FIG. 5 is a bottom plan view of the memory card of FIG. 1.

DETAILED DESCRIPTION OF THE MEMORY CARD

One or more integrated circuit chips (not shown) forming the memory system are encased in a plastic card 11 of generally rectangular shape in plan view with three corners being slightly rounded and the fourth corner being cut to form an angled surface (edge) 13 between a front side 15 and a left side 17. As shown in the drawings, the angled edge 13 intersects the adjacent sides 15 and 17 with substantially the same angle, about 45 degrees. Ten electrical contacts connected with the memory circuit chip(s) within the card are positioned in nine recesses in the top surface along the front side (edge) 15 and the angled edge 13. Because of the small size of the card, two contacts of smaller size are positioned in one of the recesses and a single contact of smaller size is positioned in a recess along the angled edge 13. Of course, a different number of contacts may alternately be used.

More specifically, as best shown in FIG. 3, recesses 19–26 are provided in a row along the front side (edge) 15 and a recess 27 along the angled edge 13. Each of the recesses is elongated in a direction perpendicular to the front side 15, provides a recessed bottom surface that is parallel with the top surface of the card and has walls surrounding three sides that make it more difficult for fingers handling the card to touch the contacts within the recess. The contacts are positioned a small distance from the front side (edge) of the card for the same purpose. But since each of the recesses opens outward through the front side 15 or edge 13 of the card, mating contacts of a receptacle (not shown) easily slide into and out of the recesses over the contacts within them as the card is respectively inserted into or removed from the receptacle.

The recesses 20–26 each contain a respective one of rectangularly shaped electrical contacts 31–37, respectively. In the same area occupied by any one of these contacts, two contacts 38 and 39 are positioned in the recess 19. In this example, the contact 38 is positioned behind the contact 39. One contact 40 of this smaller size is positioned in the recess 27 because that recess is shorter than the others. A front edge of the contact 40 is displaced a further distance away from the front card edge 15 than are the other contacts 31–37 and 39. Ten contacts are thus positioned across the small width of the card instead of just eight contacts of the same width that would fit along the front side 15 alone.

As shown in FIG. 5, a label may be attached to a bottom of the card 11 in a slight recess 43 provided in the bottom surface for that purpose.

Although the invention has been described as implemented in a specific card example, it will be understood that the invention is entitled to protection within the scope of the appended claims.

It is claimed:

1. In a flat rectangularly shaped memory card having, in plan view, first and second pairs of opposing parallel straight edges forming four corners wherein one of said corners includes an angled edge segment that intersects adjacent edges of one of each of the first and second pairs of edges at acute angles, said first pair of edges being shorter than said second pair of edges, an electrical contact structure comprising:

a row of nine rectangularly shaped recesses positioned along one of the first pair of shorter edges and the adjacent angled edge segment, the recesses being surrounded on three sides by walls, eight of the recesses opening on a fourth side to the shorter card edge and the other of the recesses opening on a fourth side to the angled edge segment, said recesses individually containing a single electrical contact mounted on a bottom surface except that the recess along the shorter card edge that is furthest removed from the angled edge segment includes two electrical contacts mounted on a bottom surface thereof, and wherein the contact in the recess that opens to the angled edge segment is set back further from the shorter edge than the contacts in the other recesses in the row.

2. The memory card electrical contact structure of claim 1, wherein the two electrical contacts within the recess furthest removed from the angled edge segment are positioned one behind the other at different distances from the shorter edge.

3. The memory card electrical contact structure of claim 1, wherein the contacts are positioned within their respective recesses with their front edges spaced a distance away from their respective shorter edge and angled edge segment.

4. A flat rectangularly shaped memory card, comprising:

two pairs of opposing parallel straight edges forming four corners wherein one of said corners includes an angled edge segment that intersects adjacent ones of the straight edges at acute angles, a plurality of rectangularly shaped recesses formed in a row extending along one of said adjacent straight edges and said angled edge segment, the recesses being surrounded on three sides by walls, at least one of the recesses being opened on a fourth side to said angled edge segment and the remaining ones of the rows of recesses being opened on a fourth side to said one of the adjacent straight edges, and said recesses individually containing a single electrical contact mounted on their bottom surfaces except that one of the recesses includes two electrical contacts mounted on its bottom surface.

5. In a flat rectangularly shaped memory card having, in plan view, first and second pairs of opposing parallel edges forming four corners including a cutoff corner having an angled edge segment that intersects adjacent edges of one of each of the first and second pairs of edges, said first pair of edges being shorter than said second pair of edges, an electrical contact structure comprising:

a plurality of nine rectangularly shaped recesses adjacent to one of the first pair of shorter edges and the cutoff corner, said recesses surrounded on three sides by walls and open on a fourth side, one of the recesses opening to the angled edge segment of the cutoff corner, the remainder opening to the one of the first pair of shorter edges, said recesses containing an electrical contact, one of said recesses containing two electrical contacts, such that there are ten contacts within the nice recesses.

6. The memory card electrical contact structure of claim 5, wherein the contacts are positioned within their respective recesses with their front edges spaced a distance away from their respective shorter edges and the angled edge segment of the cutoff corner.

7. A rectangular memory card having a cutoff corner, the memory card comprising:

a group of openings in a cover of the memory card, the group of openings adjacent a short edge and the cutoff corner of the memory card, wherein the openings expose electrical contacts of the memory card, and wherein the openings are substantially rectangular and have three sidewalls formed by the cover, and wherein one of the openings opens to the cutoff corner and the remainder of the openings open to the short edge of the memory card, and wherein one of said openings contains more than one electrical contact, such that the memory card is compatible with a multi-media card yet has an additional electrical contact.

8. The memory card of claim 7, wherein the contacts are positioned within their respective openings with their front edges spaced a distance away from the short edge and the cutoff corner.

9. In a flat memory card having a rectangular shape with a cut-off corner forming an angled edge segment between two card edges and having a plurality of rectangularly shaped recesses formed in a row along one of the two card edges and opening to said one of the two card edges with electrical contacts along bottom surfaces thereof, an arrangement of said recesses and electrical contacts, comprising:

an additional rectangular recess formed adjacent the angled edge segment and opening to the angled edge segment with an electrical contact along a bottom surface thereof, and a single electrical contact in each of the recesses along said one of the two card edges except that two electrical contacts are included in the recess furthest removed from the angled edge segment.

10. The memory card according to claim 9, wherein the two electrical contacts in the recess furthest removed from the angled edge segment are positioned one behind the other at different distance from said one of the two card edges.

11. The memory card according to claim 9, wherein the electrical contacts are positioned within their respective recesses with forward edges thereof spaced a distance away from their respective one of the two card edges and angled edge segment.

12. The memory card according to claim 9, wherein there are exactly nine recesses and ten electrical contacts therein.

13. A flat memory card having a rectangular shape with a cut-off corner forming an angled edge segment between two card edges and having a plurality of rectangularly shaped recesses formed in a row along one of the two card edges and opening to said one of the two card edges with electrical contacts on bottom surfaces thereof, wherein said electrical contacts are positioned in a pattern according to a multi-media card (MMC) standard, a single electrical contact being included in each of said recesses, a first additional rectangular recess is positioned adjacent the angled edge segment and opening thereto with a first additional electrical contact on a bottom surface thereof, and a second additional rectangular recess is positioned adjacent said one of the two card edges and furthest removed from the angled edge segment along said one of the two card edges and having second and third additional electrical contacts on a bottom surface thereof, whereby the memory card remains compatible with the multi-media card (MMC) standard while providing additional contacts.

14. The memory card according to claim 13, wherein the second and third additional electrical contacts are positioned within the recess furthest removed from the angled edge segment at different distances from said one of the two card edges.

* * * * *